United States Patent Office 3,539,530
Patented Nov. 10, 1970

3,539,530
FLAME RESISTANT ORGANOPOLYSILOXANE
COMPOSITIONS
Bruce D. Karstedt, Scotia, N.Y., assignor to General
Electric Company, a corporation of New York
No Drawing. Filed Mar. 1, 1968, Ser. No. 709,810
Int. Cl. C08g 51/62
U.S. Cl. 260—45.75        6 Claims

ABSTRACT OF THE DISCLOSURE

Flame resistant organopolysiloxane compositions are provided and a method for making them. The compositions comprise organopolysiloxane convertible to the cured solid elastic state, filler, a small but effective amount of a platinum-containing material, and a silicon hydride, having no more than 1 available $\equiv$SiH unit per molecule. The silicon hydride is employed in an amount sufficient to provide for a ratio of at least about 6 available $\equiv$SiH units per gram atom of platinum in the organopolysiloxane composition. The subject organopolysiloxane compositions can be employed to make flame resistant organopolysiloxane elastomers useful in various applications such as wire coating, window gasketing, transformer encapsulents, etc.

---

The present invention relates to organopolysiloxane compositions convertible to flame resistant organopolysiloxane elastomers and to a method for making them. More particularly, the present invention relates to the employment of a platinum-containing material in combination with a silicon hydride in an organopolysiloxane convertible to the cured solid elastic state to provide for the production of a flame resistant organopolysiloxane elastomer.

There is taught in French Pat. 1,486,530, that the use of a small but effective amount of a platinum-containing material, such as chloroplatinic acid, in an organopolysiloxane composition convertible to the cured solid elastic state, can provide for a flame resistant organopolysiloxane elastomer. It has been found that although the employment of a platinum-containing material can improve the flame resistance of organopolysiloxane elastomer compositions, the flame resistance of such organopolysiloxane elastomer compositions are sometimes not sufficient for a particular application. It often is uneconomic, as well as impracticable, to subsequently add additional amounts of platinum-containing material to the organopolysiloxane composition to improve its flame resistance. In addition, experience has shown that even if an additional amount of platinum-containing material is added, the flame resistance of the organopolysiloxane composition often is not significantly improved.

The present invention is based on the discovery that an improved degree of flame resistance can be imparted to an organopolysiloxane elastomer composition comprising an organopolysiloxane, filler, and an effective amount of a platinum-containing material, by adding or treating the platinum-containing organopolysiloxane composition, with a silicon hydride, more particularly defined hereinafter.

In accordance with the invention, there is provided an organopolysiloxane composition convertible to a flame resistant organopolysiloxane elastomer comprising (A) an organopolysiloxane, (B) a silicon hydride having no more than one available $\equiv$SiH unit per molecule, (C) filler, and (D) a small but effective amount of a platinum-containing material, where (B) is present in said organopolysiloxane composition in an amount sufficient to provide for at least six available $\equiv$SiH units per gram atom of platinum, and (A) has a ratio of from about 1.95 to 2.01 organo radicals attached to silicon by carbon-silicon linkages selected from monovalent hydrocarbon radicals and halogenated monovalent hydrocarbon radicals.

The organopolysiloxanes which can be employed in the practice of the invention are substantially free of silanol radicals which would tend to react with the silicon hydride. These organopolysiloxanes can be fluids, gums, or viscous masses and can have a viscosity between about 1000 centipoises to $50 \times 10^6$ centipoises at 25° C. The fluid organopolysiloxanes can have a viscosity up to about 100,000 centipoises at 25° C., and preferably between 3000 to 30,000 centipoises at 25° C. The organopolysiloxane gums can have a viscosity between 5,000,000 centipoises to 50,000,000 centipoises at 25° C.

The organopolysiloxanes have terminal triorganosiloxy units and can consist essentially of the same or different chemically combined siloxy units having an average of about two organo radicals attached to the silicon atom. Preferably, the organopolysiloxanes consist essentially of chemically combined dimethylsiloxy units, or a mixture of chemically combined dimethylsiloxy units and siloxy units having either a phenyl radical or a vinyl radical attached to silicon, such as a methylphenylsiloxy unit, a diphenylsiloxy unit, or a methylvinylsiloxy unit. In instances where the viscosity of the organopolysiloxane is less than 100,000 centipoises at 25° C., it is preferred to have the organopolysiloxane terminated with aliphatically unsaturated triorganosiloxy units, such as dimethylvinylsiloxy units. Optimum results are achieved if the organopolysiloxanes have at least 70 mole percent of chemically combined dimethylsiloxy units, and up to 30 mole percent of chemically combined siloxy units having phenyl attached to silicon, which can include up to 10 mole percent of siloxy units having vinyl attached to silicon, based on the total moles of dimethylsiloxy units and the aforementioned siloxy units, such as diphenylsiloxy units and methylvinylsiloxy units.

The organopolysiloxanes which can be utilized in the practice of the invention can be made by conventional hydrolysis or cohydrolysis of diorganodihalosilanes in combination with triorganohalosilanes, which can be utilized to provide for chain-stopping radicals of the resulting organopolysiloxanes. For example, trimethylchlorosilane, dimethyldichlorosilane, diphenyldichlorosilane, methylvinyldichlorosilane, etc., can be utilized. Alternatively, the organopolysiloxanes can be made by conventional equilibration procedures of the appropriate cyclopolydiorganosiloxane such as octamethylcyclotetrasiloxane in combination with other siloxanes such as decamethyltetrasiloxane, octaphenylcyclotetrasiloxane, 1,3,5,7-tetravinyl-1,3,5,7-tetramethylcyclotetrasiloxane, etc., utilizing an alkali metal equilibration catalyst such as potassium hydroxide. Methods, such as shown by Boot Pat. 3,153,007, assigned to the same assignee as the present invention, can be employed to remove equilibration catalyst from the polymer. Preferably, the proportions of the aforementioned organosiloxanes utilized in the equilibration mixture, should provide for a ratio of about 1.98 to 2.001 organo radicals per silicon atom where the organo radicals are selected from methyl, vinyl, and phenyl radicals as previously defined. For example, an organopolysiloxane can have about 85 mole percent chemically combined dimethylsiloxy units, 10 mole percent of chemically combined diphenylsiloxy units and 5 mole percent of methylvinylsiloxy units and chain-stopped with a member selected from trimethylsiloxy units and dimethylvinylsiloxy units.

In addition to the above mentioned radicals such as methyl, vinyl, and phenyl radicals attached to silicon, the organopolysiloxanes of the present invention also can have attached to silicon radicals such as aryl radicals, for example, chlorophenyl, tolyl, xylyl, naphthyl; aralykyl radicals such as phenylethyl, etc.; aliphatic, cycloaliphatic, haloaliphatic, such as alkyl radicals, for example, ethyl, propyl, butyl, pentyl, hexyl, heptyl, octyl, etc.; haloalkyl radicals such as trifluoropropyl, tetrafluorobutyl, etc.; cycloaliphatic radicals such as cyclohexyl, cycloheptyl, etc.; alkenyl radicals such as allyl, 1-propenyl, etc.

Among the silicon hydrides which are operable in the practice of the present invention there are included any silicon hydrides which have no more than one available $\equiv$SiH unit per molecule. The term "available" signifies that the $\equiv$SiH unit of the organosilicon compound is not sterically hindered. For example, there can be employed silanes such as $R_3SiH$, where R is selected from monovalent hydrocarbon radicals, halogenated monovalent hydrocarbon radicals, and hydrolyzable radicals, such as alkoxy radicals, acyloxy radicals, etc. Preferably, R has from 1 to 6 carbon atoms. For example, $(CH_3)_3SiH$;

$(C_6H_5)_3SiH$; $(CH_3)_2C_6H_5SiH$; $(C_4H_9)_3SiH$;
$C_2H_3(CH_3)_2SiH$; $CH_3(CH_3O)_2SiH$; $(C_2H_5O)_3SiH$;

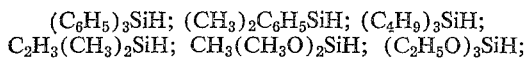

$(CF_3CH_2CH_2)_2CH_3SiH$; etc.

Siloxanes having an

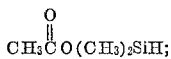

unit chemically combined with

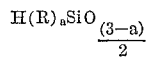

units where $a$ is a whole number equal to 0 to 2, inclusive, and $b$ is a whole number equal to 0 to 3, inclusive. For example, $H(CH_3)_2SiOSi(CH_3)_3$;

$H(C_6H_5)_2SiOSi(C_6H_5)_3$;

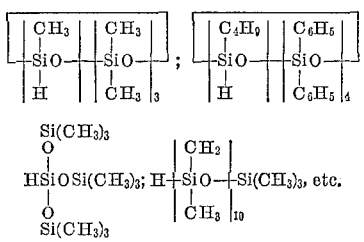

Silarylene compounds, such as $H(CH_3)_2SiC_6H_4Si(CH_3)_3$;

$H(CH_3)_2SiC_{10}H_6Si(CH_3)_3$, etc.

Silalkylene compounds, such as $H(CH_3)_2SiCH_2Si(CH_3)_3$;

$H(CH_3)_2SiC_4H_8SiC_6H_5(CH_3)_2$, etc.

Polysilanes, such as,

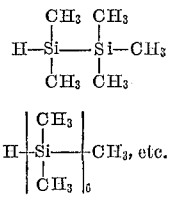

Additional examples of silicon hydrides having no more than 1 available $\equiv$SiH unit, per molecule, can be found in "Organosilicon Compounds," C. Eaborn, Butterworth Scientific Publication, London (1963) pages 56–63.

It is preferred to utilize silicon hydrides in the practice of the invention having a molecular weight which is sufficient to provide for at least 6 available $\equiv$SiH units per gram atoms of platinum and a proportion of about 0.1 part to about 10 parts of silicon hydride, per 100 parts of organo-polysiloxane composition. Depending upon the concentration of the platinum-containing material, and the molecular weight of the silicon hydride, there can be present in the organo-polysiloxane composition, a proportion as high as 500,000 $\equiv$SiH units per gram atom of platinum.

The platinum-containing material which can be employed is any of the materials generally utilized in $\equiv$SiH-olefin addition reactions. Included, for example, is elemental platinum, as shown in U.S. Pat. 2,970,150—Bailey such as plainum-on-charcoal, platinum-on-gamma-alumina, platinum-on-silica gel, platinum-on-asbestos, etc.; chloroplatinic acid ($H_2PtCl_6 \cdot 6H_2O$), as mentioned in Pat. 2,823,218—Speier. Further, the platinum-containing material can be selected from those having the formula $(PtCl_2 \cdot \text{olefin})_2$ and $H(PtCl_3 \cdot \text{olefin})$, as described in U.S. Pat. 3,159,601—Ashby. The olefin shown in the previous two formulas can be almost any type of olefin, but is preferably an alkene having from 2 to 8 carbon atoms, a cycloalkene having from 5 to 7 carbon atoms, or styrene. Specific olefins utilizable in the above formulas are ethylene, propylene, the various isomers of butylene, octylene, cyclopentene, cyclohexene, cycloheptene, etc. A further platinum-containing material usable in the composition of the present invention is the platinum chloride cyclopropane complex $(PtCl_2 \cdot C_3H_6)_2$ described in U.S. Pat. 3,159,662—Ashby.

Still further, the platinum-containing material can be a complex formed from chloroplatinic acid with up to two moles per gram-atom of platinum of a member selected from the class consisting of alcohols having the formula $R'OH$, ethers having the formula $R'OR''$, aldehydes having the formula $R'CHO$ and mixtures of the above as described and claimed in Lamoreaux Pat. 3,220,972 assigned to the same assignee as the present invention. The substituent $R'$ in the above formulas is a member selected from the class consisting of alkyl radicals having at least 4 carbon atoms, alkyl radicals substituted with an aromatic hydrocarbon radical, and alkyl radicals substituted with an $OR''$ group, where $R''$ is a member selected from the class consisting of monovalent hydrocarbon radicals free of aliphatic unsaturation and monovalent radicals free of aliphatic unsaturation and consisting of carbon, hydrogen, and oxygen atoms, with each oxygen atom being attached to two atoms, at least one of which is a carbon atom and up to one of which is a hydrogen atom.

Small but effective amounts of the platinum containing material are sufficient to impart the desired flame retardancy to the silicone rubber. In general, amounts of from about 0.5 to 250 parts of platinum per million parts of the organopolysiloxane composition can be employed. Preferably from about 1 to about 100 parts of platinum per million parts of organopolysiloxane composition can be used.

The fillers that can be employed with the organopolysiloxanes of the present invention to provide for the production of the flame resistant organopolysiloxane composition are known to the art as reinforcing and semi-reinforcing fillers. Reinforcing fillers that can be employed are, for example, the silica fillers such as fume silica, precipitated silica, silica aerogel and the like. The reinforcing fillers are preferably employed at about 35 parts of filler, per 100 parts of organopolysiloxane. In particular situations, as much as 100 parts of reinforcing filler per 100 parts of organopolysiloxane can be utilized. The preferred reinforcing filler is fume silica which can be further modified in accordance with the teaching of Lucas Pat. 2,938,009 assigned to the same assignee as the present invention.

In addition to the aforementioned reinforcing fillers, semireinforcing fillers also can be utilized which are generally known as nonstructure forming fillers such as titanium oxide, lithopone, and finely divided quartz, calcium carbonate, iron oxide, and diatomaceous earth. These fillers can be utilized in combination with the aforementioned reinforcing fillers so that the range of the filler, which can be a mixture of the reinforcing and semireinforcing variety, can vary from about 10 to about 300 parts of filler per 100 parts of the organopolysiloxane.

Various curing agents can be utilized to effect more rapid conversion of the aforementioned organopolysiloxane in combination with the above described fillers to produce organopolysiloxane elastomers. For example, there can be utilized peroxides such as dibenzoylperoxide, tertiary-butylperbenzoate, bis - (2,4 - dichlorobenzoyl)-peroxide, tertiarybutylperoxide, dicumylperoxide, etc. These curing agents or vulcanization accelerators, can be present in the organopolysiloxane composition in amounts ranging from about 0.1 to as high as 4 to 8 parts or more based on 100 parts of the organopolysiloxane. High energy electron irradiation without curing agents can also be employed to convert the organopolysiloxane to the cured solid elastic state.

In the practice of the invention the organopolysiloxane composition can be made by blending together the organopolysiloxane, the filler, platinum-containing material and the silicon hydride. Blending of the various ingredients can be achieved by milling or by dough mixing the various ingredients in accordance with standard procedures.

Although the order of addition of the various ingredients is not critical, it is preferred to make a blend of the organopolysiloxane, platium-containing material and filler, prior to the addition of the silicon hydride. The addition of other ingredients such as peroxide curing catalysts, processing aids, pigments, heat-aging stabilizers. etc., can generally be performed either prior to, during, or after the addition of the filler to the organopolysiloxane. Suitable process aids include, for example, diphenylsilanediol, silylamines, silazanes, silanol-terminated polydiorganosiloxanes, etc. Suitable heat stabilizers include, for example, rare-earth metal salts, as taught for example, by Bobear Pat. 3,142,655, arylurethane, as taught by Simpson Pat. 3,017,378, both assigned to the same assignee as the present invention.

In instances where the silicon hydride is volatile material, for example, trimethylsilane, the silicon hydride can be incorporated into the blend in the form of a vapor while the blend is being agitated.

The organopolysiloxane composition of the present invention can be converted to the cured solid elastic state by conventional press curing in a molding procedure such as utilizing temperatures in the range of between 100° C. to 200° C. for 30 minutes or less. The molded organopolysiloxane slabs can thereafter be post baked for periods of 1 hour or more at temperatures of between 100° C. to 250° C.

In order that those skilled in the art will be better able to practice the invention, the following examples are given by way of illustration and not by way of limitation. All parts are by weight.

EXAMPLE 1

An organopolysiloxane master batch was prepared by milling a blend of fumed silica and an organopolysiloxane chain-stopped with trimethylsiloxy units consisting essentially of chemically combined dimethylsiloxy units. A process aid was utilized in the form of a low molecular weight methoxy chain-stopped polysiloxane consisting essentially of chemically combined diphenylsiloxy units and dimethylsiloxy units. There were also used a heat-aging stabilizer in the form of a mixture of rare earth metal octoates, and dichlorobenzoyl peroxide mixed with a polydimethylsiloxane fluid.

The organopolysiloxane had a viscosity of about 25 million centipoises at 25° C. and contained about 0.2 mole percent, based on the total moles of chemically combined siloxy units, of methylvinylsiloxy units. There was employed 100 parts of the organopolysiloxane, 47.4 parts of fumed silica, 2.5 parts of the methoxy chain-stopped process aid, 0.4 part of rare earth metal octoates, and 3.3 parts of dichlorobenzoyl peroxide.

The above organopolysiloxane master batch was then divided into three parts. The first part was made into a platinum-containing blend by milling the master batch on a two roll mill while adding a 25% solution of chloroplatinic acid hexahydrate. The second part of the master batch was converted into a silicon hydride blend by milling the master batch with 1,1,1,2,3,3,3-heptamethyltrisiloxane. The remaining part of the master batch was then employed for use in combination with the platinum-containing blend and the silicon hydride containing blend to prepare a series of organopolysiloxane compositions having varying ratios of ≡SiH units per gram atom of platinum.

The organopolysiloxane compositions contained from 1 part of platinum per million parts of organopolysiloxane composition to 80 parts of platinum per million parts of organopolysiloxane composition. The amount of heptamethyltrisiloxane utilized was sufficient to provide for a range of from 0.025 to 2 parts of the heptamethyltrisiloxane per 100 parts of the organopolysiloxane composition. The various organopolysiloxane compositions were then molded for 15 minutes at 287° F. and post baked for 1 hour at 300° F. The flame resistance of the cured slabs were determined by suspending the cured slab having dimensions of 0.5 inch by 6 inches by 0.075 inch from a metal wire in a glass chimney in a draft-free atmosphere over a blue flame (approximately 1100° C.) in such a manner that the tip of the slab was suspended 1 inch into the flame. The slab was then held in the flame for a period of about 20 seconds at which time the flame was removed and the time required for complete extinguishment of the flame was measured. In the table below "Burning Time" is in seconds. The expression "% Consumed" is calculated by weighing the slab before and after ignition and after burning ceased. Prior to the final weighing, the slab is freed of loose ash. The term "Pt" in the table indicates the parts of platinum per million parts of organopolysiloxane composition in the slab tested. The factor "≡SiH/g. atom Pt" shows the ratio of silicon hydride units per gram atom of platinum in the slab.

| Pt | SiH/g. atom Pt | Buring time | Percent consumed |
| --- | --- | --- | --- |
| 0  | 0      | 220 | 100 |
| 1  | 0      | 240 | 75  |
| 1  | 256    | 71  | 10  |
| 1  | 444    | 77  | 10  |
| 1  | 9,000  | 76  | 8   |
| 2  | 0      | 94  | 19  |
| 2  | 2,100  | 66  | 7   |
| 2  | 6,600  | 61  | 1   |
| 10 | 0      | 80  | 19  |
| 10 | 895    | 50  | 12  |
| 10 | +1,770 | 89  | 12  |
| 20 | 0      | 65  | 26  |
| 20 | 226    | 83  | 9   |
| 20 | 660    | 91  | 18  |
| 80 | 0      | 104 | 12  |

EXAMPLE 2

A series of organopolysiloxane blends are prepared utilizing an organopolysiloxane having a viscosity of about 3,000 centipoises at 25° C. The organopolysiloxane is chain-stopped with dimethylvinylsiloxy units and it consists of about 90 mole percent of dimethylsiloxy units, 5 mole percent of diphenylsiloxy units, and about 5 mole percent of methylvinylsiloxy units. There is mixed with 100 parts of the organopolysiloxane, about 50 parts of diatomaceous earth and 3.3 parts of 2,4-dichlorobenzoyl peroxide. The organopolysiloxane blend is divided into two parts. A platinum-containing master batch is prepared by adding a 10 percent solution of chloroplatinic acid in isopropanol to one of the parts.

Mixtures of the above organopolysiloxane blend and platinum-containing master batch are prepared to produce organopolysiloxane compositions having from 1, 10, 20, 50 and 100 parts of platinum per million parts of composition. One of the organopolysiloxane compositions is placed in a vessel at 0° C. The vessel is sealed and evacuated to a pressure of about 200 mm. Trimethylsilane at a temperature of about −10° C. is added to provide for a mixture of 0.1 part of silicon hydride per 100 parts of organopolysiloxane composition. The vessel is then allowed to warm to ambient temperatures. The mixture in the vessel is then thoroughly agitated for a period of five hours. This procedure is repeated until all of the platinum-containing compositions are treated with trimethylsilane. In addition, an organopolysiloxane composition free of platinum is also treated in a similar manner.

Slabs are molded from the respective organopolysiloxane compositions treated with trimethylsilane containing 0, 1, 10, 20, 50 and 100 parts of platinum, per million parts of composition. Based on method of preparation the slabs contain at least six ≡SiH units per gram atom of platinum. Slabs are also molded from platinum-containing blends respectively containing 0, 1, 10, 20, 50 and 100 parts of platinum per million of composition, which are not treated with trimethylsilane. The various slabs are molded for 15 minutes at 140° C. and thereafter post baked for 1 hour at 150° C. When the cured slabs are tested for flame resistance in accordance with the method of Example 1, it is found that the slabs made from the organopolysiloxane compositions made in accordance with the practice of the invention have superior flame resistance when compared to the slabs free of platinum-containing material and the slabs which are not treated with trimethylsilane.

While the foregoing examples have of necessity been limited to only a few of the very many variables within the scope of the present invention, it should be understood that the present invention is directed to a much broader class of organopolysiloxane compositions and methods for making them.

What I claim as new and desire to secure by Letters Patent of the United States is:

1. An organopolysiloxane composition comprising (A) an organopolysiloxane, (B) a silicon hydride having no more than one available ≡SiH unit per molecule, (C) at least one reinforcing or semi-reinforcing filler, and (D) a small but effective amount of a platinum-containing material, where (B) is present in said organopolysiloxane composition in an amount sufficient to provide for at least 6 available ≡SiH units, per gram atom of platinum and (A) has a ratio of from about 1.95 to 2.01 organo radicals attached to silicon by carbon-silicon linkages selected from monovalent hydrocarbon radicals and halogenated monovalent hydrocarbon radicals.

2. An organopolysiloxane composition in accordance with claim 1, containing from 1 to 100 parts of platinum, per million parts of organopolysiloxane composition.

3. A composition in accordance with claim 1, where said organopolysiloxane has a viscosity between 1,000 centipoises to 50 million centipoises at 25° C.

4. A composition in accordance with claim 1, where said organopolysiloxane consists essentially of chemically combined dimethylsiloxy units.

5. An organopolysiloxane composition in accordance with claim 1, where said organopolysiloxane consists essentially of chemically combined siloxy units having a radical selected from the class consisting of methyl, phenyl, and vinyl radicals attached to silicon.

6. An organopolysiloxane composition in accordance with claim 1, containing a peroxide curing catalyst.

References Cited

UNITED STATES PATENTS 3,159,601   12/1964   Ashby _____ 260—46.5

FOREIGN PATENTS 1,486,530              France.
822,649   10/1959   Great Britain.

DONALD E. CZAJA, Primary Examiner

V. P. HOKE, Assistant Examiner

U.S. Cl. X.R.

260—37, 45.7, 46.5